(12) United States Patent
Hayashi et al.

(10) Patent No.: US 7,988,189 B2
(45) Date of Patent: Aug. 2, 2011

(54) AIR BAG COVER AND AIR BAG DEVICE

(75) Inventors: Naoya Hayashi, Osaka (JP); Tadaaki Sekino, Osaka (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 45 days.

(21) Appl. No.: 12/532,771

(22) PCT Filed: Apr. 9, 2008

(86) PCT No.: PCT/JP2008/057022
§ 371 (c)(1),
(2), (4) Date: Sep. 23, 2009

(87) PCT Pub. No.: WO2008/126867
PCT Pub. Date: Oct. 23, 2008

(65) Prior Publication Data
US 2010/0109299 A1    May 6, 2010

(30) Foreign Application Priority Data

Apr. 11, 2007  (JP) .................... 2007-103831

(51) Int. Cl.
*B60R 21/16* (2006.01)
(52) U.S. Cl. ........................................ 280/731
(58) Field of Classification Search ............ 280/731
See application file for complete search history.

(56) References Cited

U.S. PATENT DOCUMENTS

| | | | |
|---|---|---|---|
| 5,678,851 A | 10/1997 | Saito et al. | |
| 6,142,510 A | 11/2000 | Endo et al. | |
| 6,626,458 B2 * | 9/2003 | Fujita et al. | 280/728.3 |
| 6,672,614 B2 * | 1/2004 | Endo et al. | 280/731 |
| 6,837,514 B1 * | 1/2005 | Fujita et al. | 280/731 |
| 7,354,060 B2 * | 4/2008 | Thomas | 280/728.3 |
| 7,766,381 B2 * | 8/2010 | Fujimori et al. | 280/731 |
| 2004/0174002 A1 | 9/2004 | Sauer | |
| 2005/0079305 A1 | 4/2005 | Krappmann | |
| 2005/0275197 A1 | 12/2005 | Kaifuki et al. | |
| 2006/0202446 A1 | 9/2006 | Chavez et al. | |

FOREIGN PATENT DOCUMENTS

| | | |
|---|---|---|
| EP | 1 493 545 A1 | 1/2005 |
| JP | 5 105013 | 4/1993 |
| JP | 2002 166808 | 6/2002 |

(Continued)

OTHER PUBLICATIONS

Office Action issued Dec. 8, 2010 in Chinese Application No. 200880011240.4, filed Apr. 9, 2008 (With English Translation).

(Continued)

*Primary Examiner* — Faye M. Fleming
(74) *Attorney, Agent, or Firm* — Oblon, Spivak, McClelland, Maier & Neustadt, L.L.P.

(57) ABSTRACT

An air bag cover or air bag device that secures the escape path of an air bag in an upper part of a steering wheel. Developing lines are formed in an air bag cover. When the air bag is inflated and developed, the air bag cover is divided into an upper open portion, left open portion, right open portion, and lower open portion so as to be opened. A decorative part is formed on the left open portion, and the upper open portion is difficult to be caught on a wheel part of the steering wheel.

10 Claims, 9 Drawing Sheets

| FOREIGN PATENT DOCUMENTS | | |
|---|---|---|
| JP | 2002 193059 | 7/2002 |
| JP | 2004 268911 | 9/2004 |
| JP | 2005-1402 | 1/2005 |
| JP | 2006-1326 | 1/2006 |

OTHER PUBLICATIONS

Supplementary European Search Report issued Dec. 21, 2010, in Patent Application No. 08740125.3.

* cited by examiner

F I G . 3
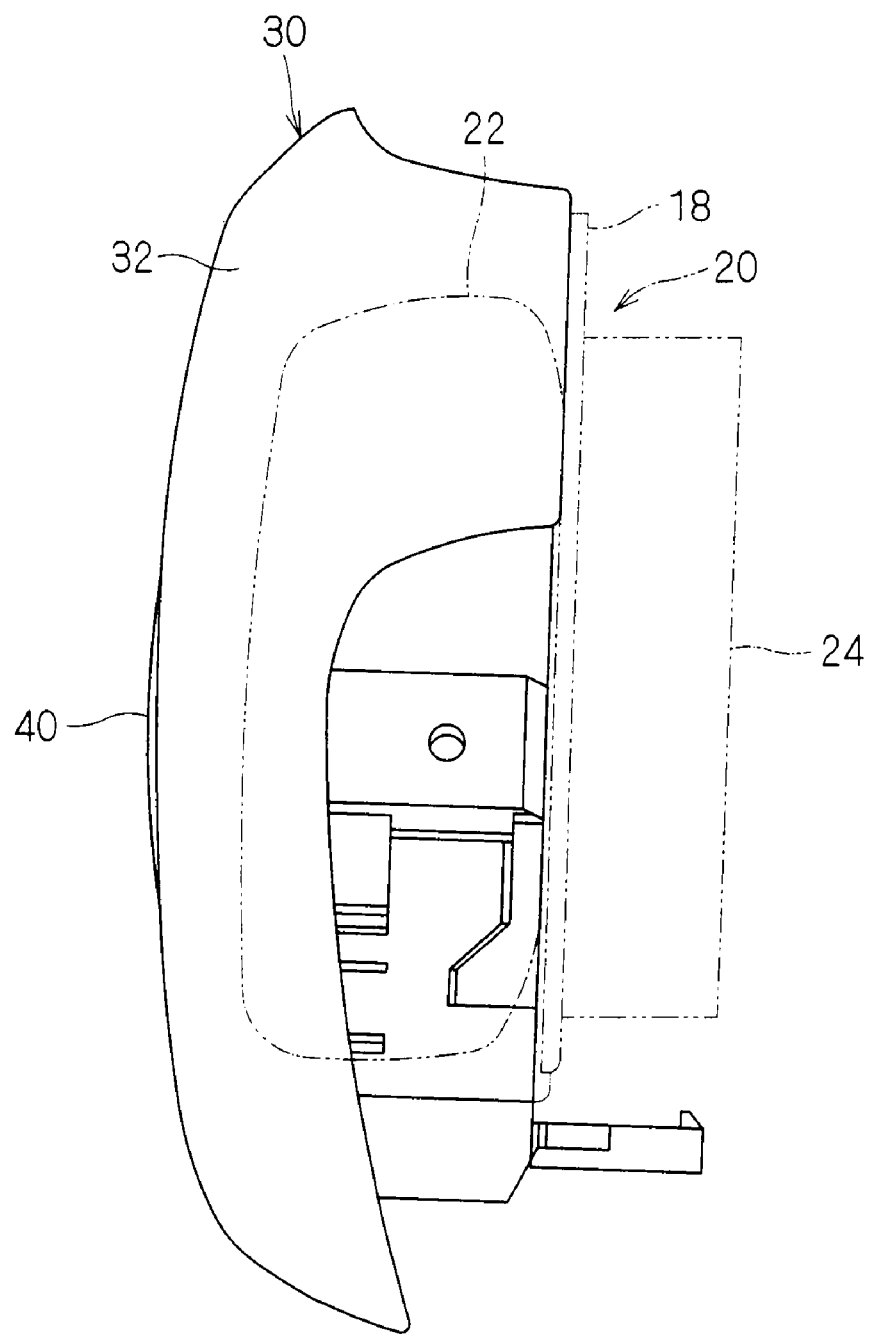

F I G. 4
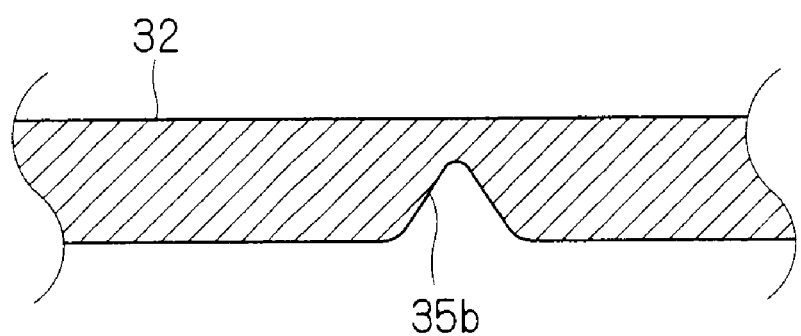

AIR BAG COVER AND AIR BAG DEVICE

TECHNICAL FIELD

This invention relates to a technique covering an air bag assembled in a steering wheel.

BACKGROUND ART

An air bag device including an inflator capable of jetting gas, an air bag capable of being inflated and developed by jetting gas from the inflator, and a covering body for covering the air bag is assembled in a steering wheel of a vehicle.

The aforementioned air bag is configured to be housed inside the aforementioned covering body with being folded back in a normal time, and inflated by gas jetted from the inflator in an emergency such as collision so as to tear and open the aforementioned covering body, thereby inflating and developing in front of a driver.

By the way, a decorative part may be provided in a substantially center part of the covering body for the purpose of enhancing a decorative effect or the like.

Conventionally, a configuration of tearing and opening a covering body provided with the decorative part in inflating and developing an air bag is disclosed in Patent Document 1 (Japanese Patent Application Laid-Open No. 2006-1326).

In Patent Document 1, an air bag cover is divided into four parts and opened in inflating an air bag. At this time, an emblem part in the substantially center part of the air bag cover is opened, being integrated with a part opening upward out of the dividing parts of the air bag cover.

DISCLOSURE OF INVENTION

Here, assuming that an occupant is out of position (OOP: Out Of Position), the occupant leans forward, and is closer to a steering wheel particularly at an upper part of the steering wheel. When an air bag is inflated and developed with this state, the air bag may make a relatively large impact on an occupant body near the upper part of the steering wheel.

In this case, if an inside part of a wheel part is open, it is possible to absorb the impact on the occupant body by allowing the air bag to escape into the inside part of the wheel part.

However, as the aforementioned Patent Document 1, when an emblem part 212 is integrated with a dividing part of an air bag cover 210, this adds a length to an outward protrusion length. Therefore, as shown in FIGS. 9 and 10, the dividing part is easily caught on a wheel part 222. That blocks an escape path of an air bag 230 at the upper part of a steering wheel 220 when an occupant P is out of position, or in other similar cases.

It is therefore an object of the present invention to secure an escape path of an air bag at an upper part of a steering wheel.

In order to solve the above problem, according to a first aspect of the invention, an air bag is assembled in a steering wheel, including a cover main part attached so as to cover an air bag in an inner periphery side of a wheel part of the steering wheel, a decorative part formed on a surface of the cover main part at a position of substantially center of the steering wheel, wherein a developing line is formed in the cover main part so as to divide the cover main part into three or more and open the cover main part by inflating and developing the air bag, the developing line being formed at a position so as to open at least one of respective open portions of the cover main part to the direction other than an upside of the steering wheel, and the decorative part is formed on a portion opening toward a direction other than the upside of the steering wheel in the cover main part.

Thereby, the develop line for dividing the cover main part into three or more and open it by inflating and developing the air bag is formed on the cover main part, the developing line being formed at the position so as to open an open portion other than the upside of the steering wheel at least out of the open portions of the cover main part, and the decorative part is formed on a portion opening toward a direction other than the upside of the steering wheel in the cover main part. Therefore, when the cover main part is divided by inflating and developing the air bag, the decorative part is opened with the portion opening in a direction other than the upside of the steering wheel in the cover main part. Then, the dividing portion of the air bag cover is not easily caught on a wheel part of the steering wheel at the upper part of the steering wheel, thereby securing an escape path of the air bag escaping to an inside part of the wheel part.

According to a second aspect of the invention, in the air bag cover according to the first aspect of the invention, the developing line is formed so as to open the portion in the cover main part where the decorative part is formed, toward a side of a vehicle or downward thereof.

According to a third aspect of the invention, in the air bag cover according to the first aspect of the invention, developing line for dividing the cover main part into three or more and opening the cover main part by inflating and developing the air bag, is formed at the position dividing the cover main part into an upper open portion opening upward a vehicle, a lower open portion opening downward the vehicle, a left open portion opening in a left direction of the vehicle, and a right open portion opening in a right direction of the vehicle, and the decorative part is formed on any of the lower open portion, the left open portion, and the right open portion.

The dividing portion of the air bag cover is thereby not easily caught on the wheel part of the steering wheel at the upper part of the steering wheel because of the decorative part. Accordingly, the escape path of the air bag for escaping to the inside part of the wheel part is secured.

According to a fourth aspect of the invention, in the air bag cover according to any of the first to third aspects of the invention, the developing line is formed as a plurality of the developing lines, each of the developing lines intersecting each other obliquely.

The developing line is thereby formed as a plurality of the developing lines, each of which intersecting each other obliquely, adding the force of dividing predetermined developing lines onto the other developing lines diagonally. Thus, the predetermined developing lines smoothly divides the other developing lines successively, allowing to tear the air bag cover smoothly.

Further, in order to solve the above problem, according to a fifth aspect of the invention, an air bag device assembled in the steering wheel includes an air bag attached to substantially center of the steering wheel, a gas supply part for inflating and developing the air bag, and an air bag cover according to any of the first to fourth aspects of the invention.

The air bag cover is thereby integrated with the gas supply part, and is provided with a configuration in which the escape path of the air bag for escaping to the inside of the wheel part of the steering wheel is secured.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a side view of showing the air bag cover.

FIG. 4 is a cross-sectional view taken along the line IV-IV of FIG. 2.

BEST MODE FOR CARRYING OUT THE INVENTION

Figure 1:
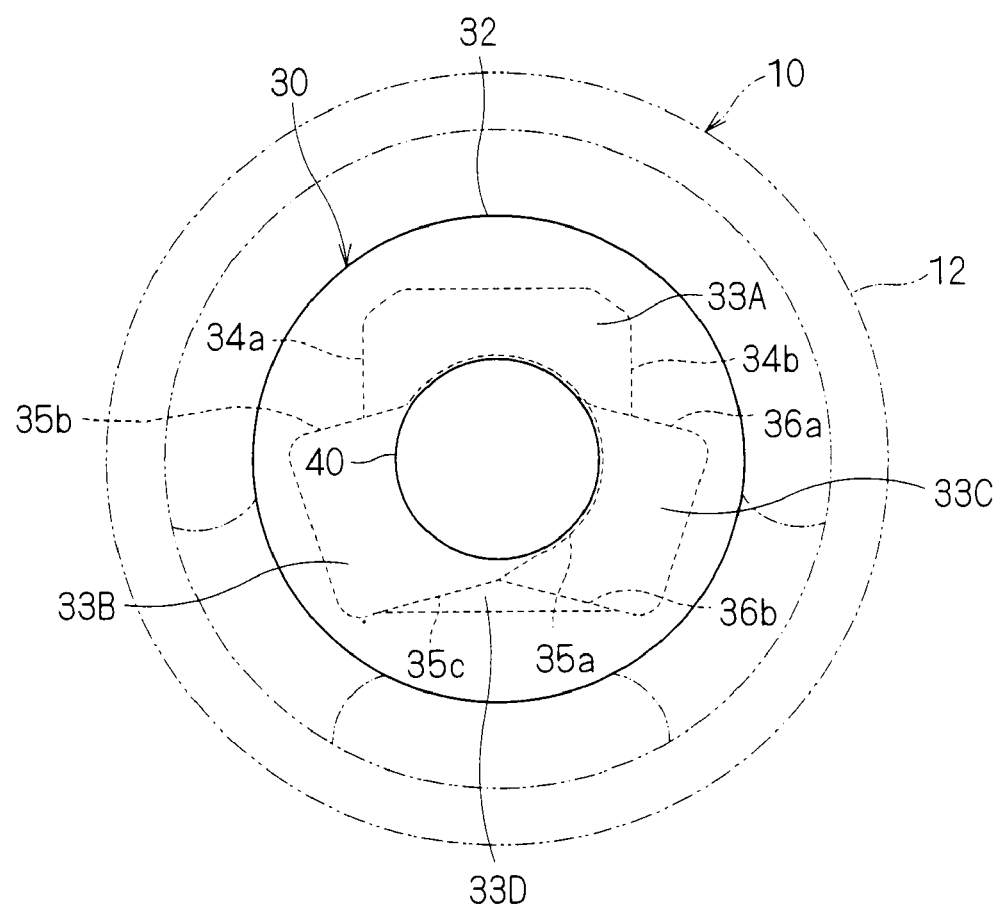
FIG. 1 is a front view of a steering wheel with an air bag cover and an air bag device assembled therein.
Figure 2:
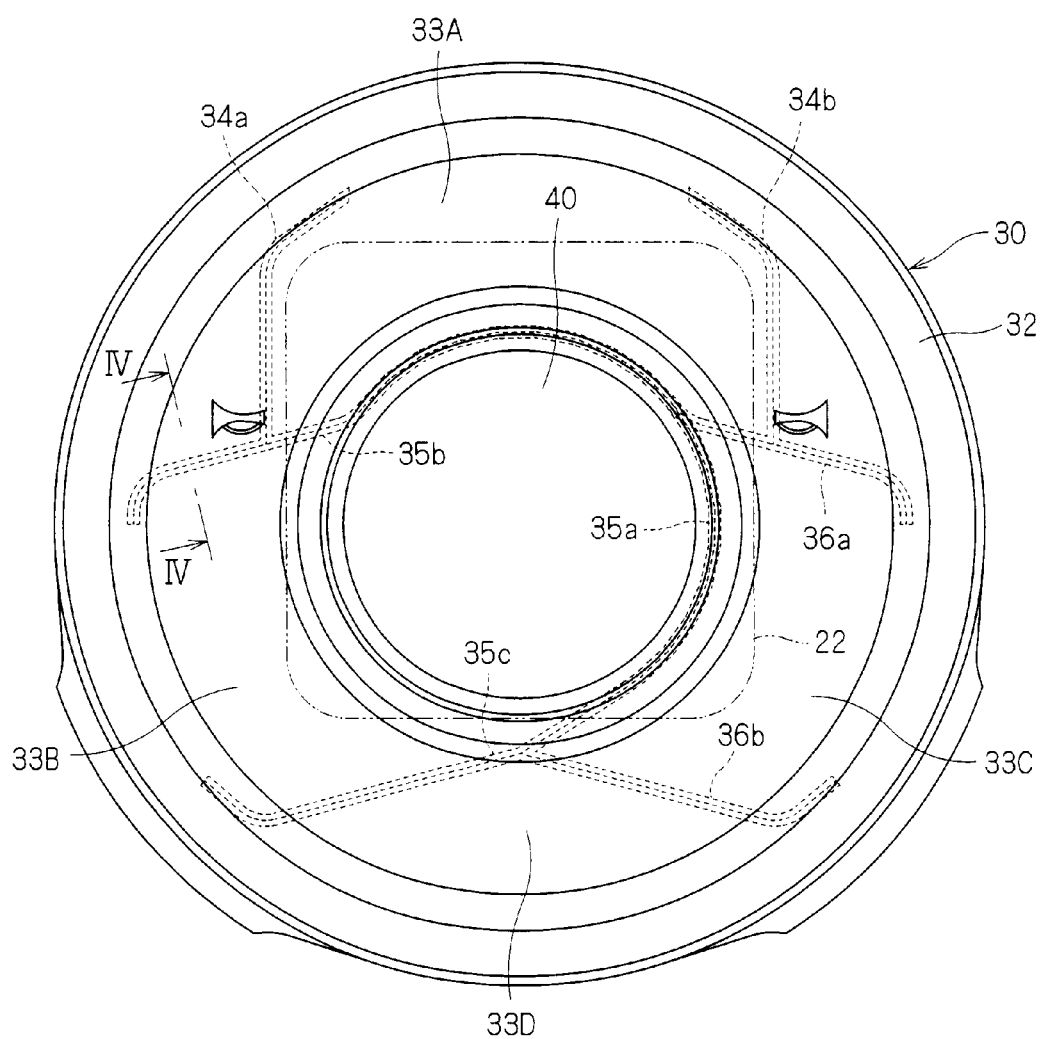
FIG. 2 is a front view of showing the air bag cover.

Hereinafter, an air bag cover and an air bag device according to a preferred embodiment will be described. FIG. 1 is a front view of showing a steering wheel with an air bag cover and an air bag device assembled therein, FIG. 2 is a front view of the air bag cover, and FIG. 3 is a side view of the air bag cover.

This air bag cover 30 and air bag device 20 are assembled in a steering wheel 10 of an automobile, and the air bag device 20 includes an air bag 22, an inflator 24 as a gas supply part, and an air bag cover 30.

The air bag 22 is formed to be pouched with cloth or the like, and disposed and attached to a substantially center part of the steering wheel 10 with being folded back. Here, a base plate 18 is fixed to a boss part of the steering wheel 10, and the air bag 22 is attached to the base plate 18.

Further, the inflator 24 inflates and develops the aforementioned air bag 22. Here, the inflator 24 has an ignition system and a gas generating agent or the like, and is fixed to a back surface of the aforementioned base plate 18. Then, the inflator 24 is configured to receive such as an ignition order signal from an impact sensor part of a vehicle or the like, and ignite the ignition system, thereby burning a gas generating agent and supplying the generated gas into the air bag 22.

The air bag cover 30 is fixed to the aforementioned base plate 18 so as to cover the aforementioned air bag 22.

Then, when the aforementioned air bag 22 is inflated by supplying gas from the inflator 24, the air bag cover 30 is subjected to the inflating force of the air bag 22, and tears along predetermined developing lines 34a, 34b, 35a, 35b, 35c, 36a, and 36b (also referred to as tear lines). Thereby, the air bag 22 is inflated and developed to be pouched at a driver side which is a surface side of the steering wheel 10.

The air bag cover 30 will be described more in detail.

The air bag cover 30 includes a cover main part 32 and a decorative part 40.

The cover main part 32 is formed of a resin or other similar materials, and a whole shape thereof is substantially bowl-shaped. Then, the cover main part 32 is attached and fixed to the aforementioned base plate 18 with screws and an engagement structure or the like in the inner periphery side of a ring-like wheel part 12 of the steering wheel 10 with a position and posture so as to house and cover the air bag 22.

The decorative part 40 is formed in a substantially center part of the steering wheel 10 on the surface of the aforementioned cover main part 32. This decorative part 40 is formed to be a shape of modeling letters or the like representing an emblem or a logo of an automobile, or a vehicle's name, and functions to enhance the decorative effect or the like. In the present preferred embodiment, the decorative part 40 has a substantially circular periphery and an internal shape thereof is omitted. This decorative part 40 may be fixed to the cover main part 32 later with the engagement structure, screws, or fixing members such as adhesive, or may be integrally formed with the cover main part 32. Here, the decorative part 40 that is a different member from the cover main part 32 is attached and fixed to the cover main part 32 with the engagement structure or the like.

The foregoing decorative part 40 has a relatively complicate shape. Therefore, it is common not to divide the decorative part 40 by the developing lines described later so as not to break into small pieces and scatter when the air bag is inflated and developed.

Further, in the cover main part 32, the developing lines 34a, 34b, 35a, 35b, 35c, 36a, and 36b are formed for dividing the cover main part 32 into three or more by inflating the air bag 22, and opening the air bag 22 so as to be inflated and developed toward the driver side. Each of the developing lines 34a, 34b, 35a, 35b, 35c, 36a, and 36b is a portion for easily dividing the cover main part 32 by being subjected to the inflating and developing force of the air bag 22, and here, as shown in FIG. 4, is a substantially V-shaped notch formed on a back surface of the cover main part 32.

These developing lines 34a, 34b, 35a, 35b, 35c, 36a, and 36b are formed at the position where a left open portion 33B that is a part of the cover main part 32 is opened as an open portion to a direction other than the upside of the steering wheel 10. Then, the aforementioned decorative part 40 is integrally formed in the left open portion 33B, and the decorative part 40 is opened together with the left open portion 33B to the direction other than the upside of the steering wheel 10. It should be noted that the top and bottom and right and left of the steering wheel 10 is based on a posture of the steering wheel 10 when a vehicle proceeds straight forward.

To describe more specific, the aforementioned developing lines 34a, 34b, 35a, 35b, 35c, 36a, and 36b are formed at the position of dividing the cover main part 32 into three or more and opening it to several directions.

That is, the developing line 35a is formed so as to surround the periphery of the decorative part 40 from a diagonally left upper part through an upper part and a right part to a diagonally right lower part, and the developing lines 35b and 35c are formed from both ends of the developing line 35a to a diagonally left downward. The left open portion 33B that is able to open to a left direction of the vehicle and integrally provided with the decorative part 40 is formed with a part surrounded by those developing lines 35a, 35b, and 35c.

Further, the developing lines 36a and 36b are formed from a diagonally right upper part of the decorative part 40 which is an intermediate part of the developing line 35a, and from the intermediate part of the developing line 35c to a diagonally right downward. The right open portion 33C that is able to open to a right direction of the vehicle is formed with a part surrounded by these developing lines 36a and 36b and a part of the aforementioned developing lines 35a and 35c.

Moreover, the lower open portion 33D that is able to open downward the vehicle is formed with a part of the aforementioned developing lines 35c and 36b.

Still further, the developing lines 34a and 34b are formed to extend upward from the intermediate part of the aforementioned developing lines 35b and 36a. The upper open portion 33A that is able to open upward the vehicle is formed with a part surrounded by those developing lines 34a and 34b and a part of the developing lines 35a, 35b, and 36a.

A line that is easily divided is not formed in a periphery side of the cover main part 32 among the aforementioned upper open portion 33A, left open portion 33B, right open portion 33C, and lower open portion 33D. Accordingly, these open portions 33A, 33B, 33C, and 33D are formed to open outwardly like a hinged door with a state of being attached to the cover main part 32 at the periphery side of the cover main part 32.

Further, in this cover main part 32, the developing lines 34a and 35b intersect as a three-forked road, and the intersection is set such that the developing lines 34a and 35b intersect each other obliquely, that is, they are not in the position relationship of being perpendicular to each other. More specifically, the developing line 34a extending to a vertical direction and the developing line 35b on a slant intersect each other obliquely.

Still further, at the intersection of the other developing lines 34b and 36a, the intersection of the developing lines 35c and 36b, and the intersection of 35a and 36a, each of the developing lines similarly intersect obliquely.

That those of the developing lines 34a and 35b, the developing lines 34b and 36a, the developing lines 35c and 36b, and the developing lines 35a and 36a or the like intersect each other obliquely refers to that an extending direction of each line at the respective intersections is oblique. For instance, that with respect to the intersections of the curved developing line 35a and the developing line 36a, both lines intersect each other obliquely refers to that a tangent of the curved developing line 35a and the developing line 36a at the above intersection intersect each other obliquely. When the intersecting developing lines are flexed on the way, a straight line part including the intersection is to be a reference of whether being oblique or not.

The operation of the air bag device 20 and the air bag cover 30 configured as the above will be described.

Figure 5:
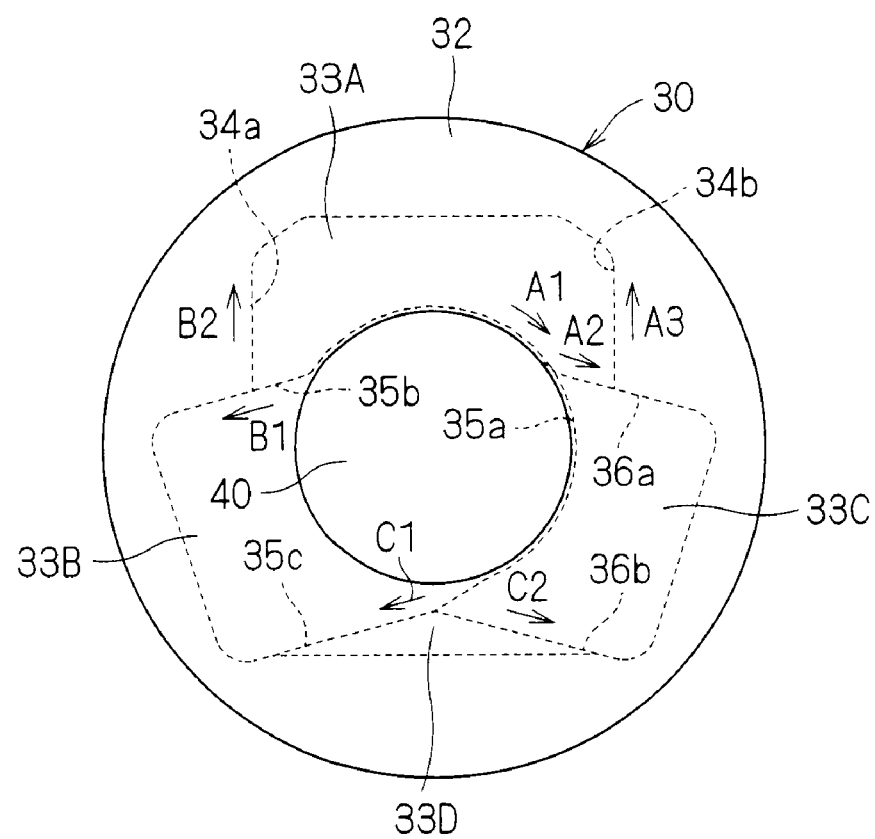
FIG. 5 is a view of showing a state of the air bag cover on the way of inflating and developing the air bag.

That is, when the vehicle collides, the inflator 24 supplies gas into the air bag 22 to inflate and develop the air bag 22. Thereby, the force from inside toward outside acts on the air bag cover 30. Then, as shown in FIG. 5, with this force, the air bag cover 30 is divided from the substantially center part outwardly as the developing lines 34a, 34b, 35a, 35c, 36a, and 36b tear.

More specifically, the inflating and developing force of the air bag cover 30 acts as force dividing the developing line 35a of the substantially center part of the air bag cover 30, and as shown by an arrow A1, dividing so as to press and tear the developing line 35a. Then, when reaching the intersection with the other developing line 36a on the way of dividing, the aforementioned inflating and developing force is transmitted as force dividing the other developing line 36a to tear and divide the other developing line 36a.

If the developing line 35a and the other developing line 36a intersects almost perpendicularly at this time, the dividing force is difficult to act as force dividing the other developing line 36a intersecting as branching along the dividing direction because the dividing force tends to act along the primary developing line 35a. Accordingly, the other developing line 36a intersecting is difficult to be divided. On the other hand, here, the developing line 35a and the other developing line 36a intersects obliquely, so that the dividing force acting along the primary developing line 35a easily acts as force dividing the aforementioned other developing line 36a intersecting. Therefore, next other developing line 36a is easily divided.

When the developing line 35a tears to each end, its dividing force acts as force tearing subsequent developing lines 35b and 35c, and as shown by arrows B1 and C1, each of the developing lines 35b and 35c is divided.

Further, when each of the developing lines 35b, 35c, and 36a reaches the intersections with the developing lines 34a, 36b, and 34b, respectively, on the way of dividing, the aforementioned inflating and developing force is transmitted as force dividing the other developing lines 34a, 36b, and 34b intersecting obliquely. Thereby, the other developing lines 34a, 36b, and 34b are easily and certainly divided as shown by arrows B2, C2, and A3.

At this time, similarly as the above, the developing lines 34a, 36b, and 34b intersecting as branching along the dividing direction are oblique to the primary developing lines 35b, 35c, and 36a, so that the force dividing the primary developing lines 35b, 35c, and 36a is easily transmitted as force dividing the developing lines 34a, 36b, and 34b intersecting. Accordingly, they are easily and certainly divided.

Figure 6:
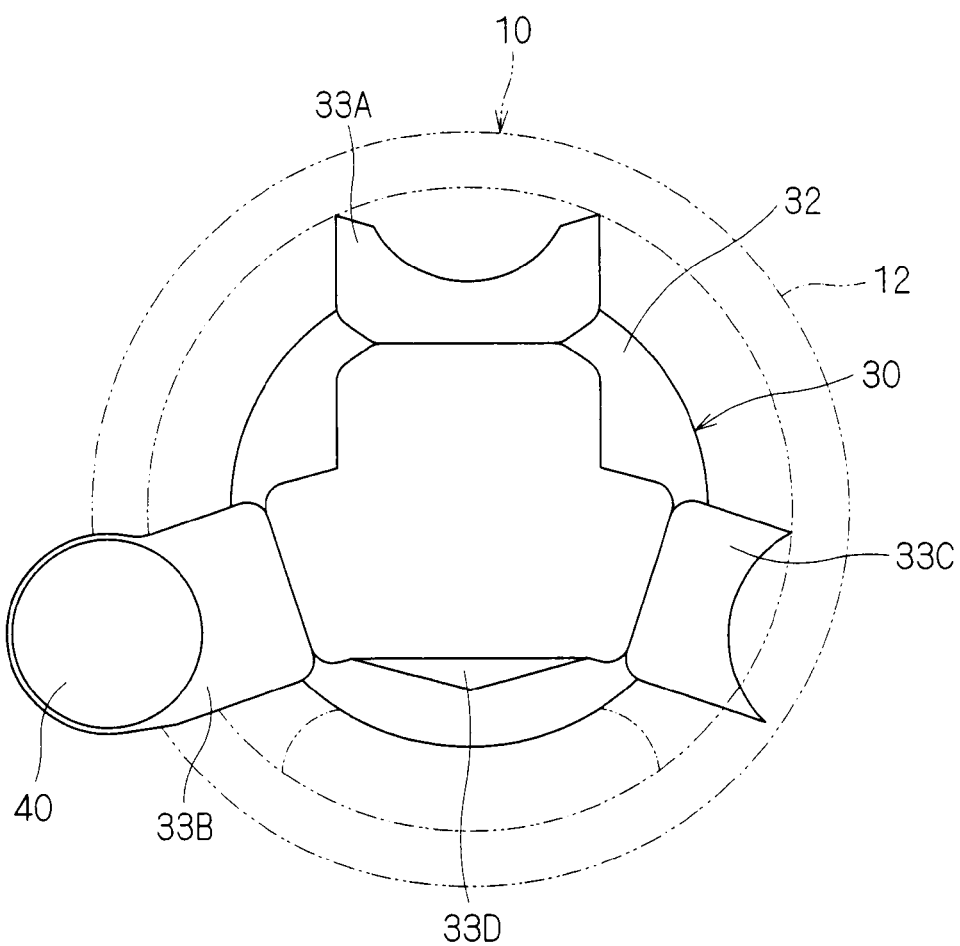
FIG. 6 is a view of showing a state of each open portion of the air bag cover being opened.

As described above, each of the upper open portion 33A, left open portion 33B, right open portion 33C, and lower open portion 33D is open from the substantially center part thereof to the periphery side like a hinged door, as shown in FIG. 6, by dividing all of 34a, 34b, 35a, 35b, 35c, 36a, and 36b. Then, the air bag 22 is inflated and developed through an opening formed thereby in the air bag cover 30 to the driver side outside the air bag cover 30.

Figure 7:
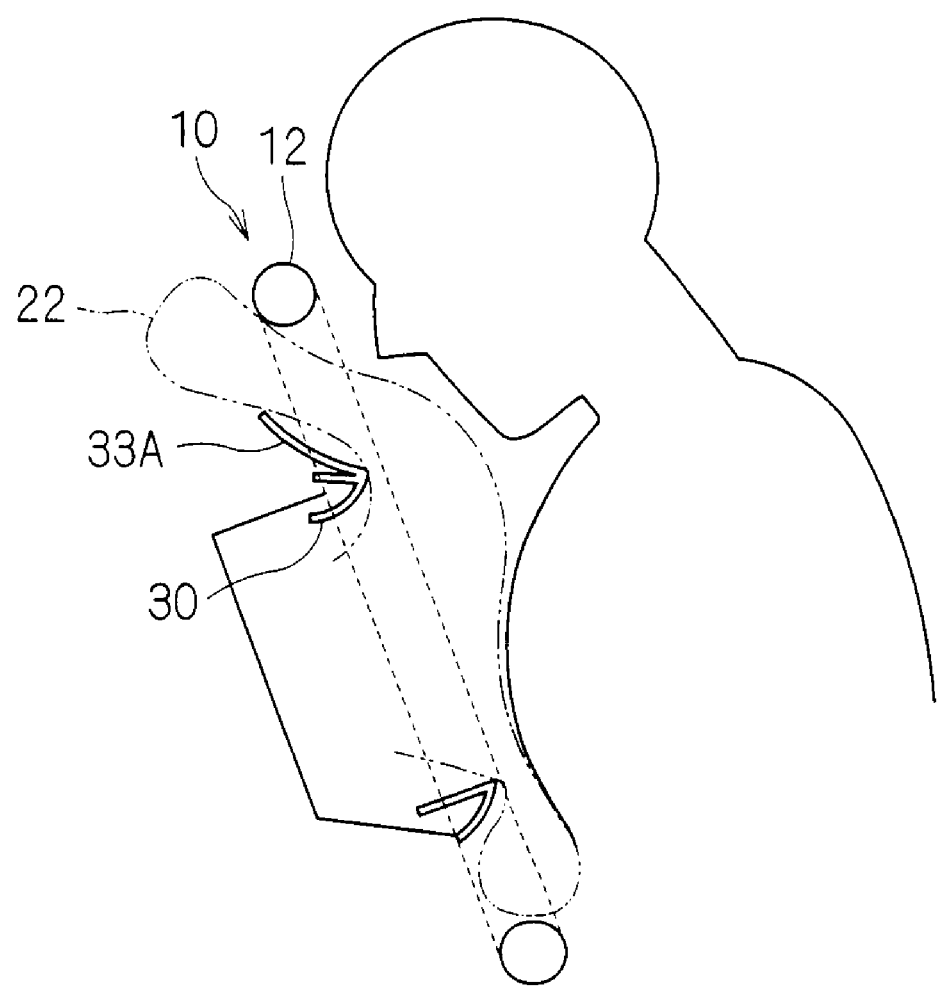
FIG. 7 is a view of illustrating a state of inflating and developing the air bag in an out of position.

At this time, as shown in FIGS. 6 and 7, the extending length from a bottom end part to a top end part of the upper open portion 33A not provided with the decorative part 40 is smaller than the distance from the bottom end part to the inner periphery of the wheel part 12. Accordingly, it is possible to change the posture of the upper open portion 33A to lean toward a side back surface of the air bag cover 30 without being caught on the wheel part 12.

Thus, even when an occupant is out of position to lean forward, and closer to the steering wheel 10 at the upper part of the steering wheel 10, the upper open portion 33A changes its posture to lean toward the side back surface of the air bag cover 30 through inside the wheel part 12. Therefore, the impact on the occupant is absorbed by deforming the air bag 22 so as to escape to the inside part of the wheel part 12.

It should be noted here that the left open portion 33B provided with the decorative part 40 is caught on the wheel part 12. However, even with consideration of the aforementioned out-of-position of the occupant, the impact at the side and bottom of the wheel part 12 is not particularly a problem, so that the left open portion 33B being caught on is allowable.

According to the air bag cover 30 and the air bag device 20 configured as the above, the developing lines 34a, 34b, 35a, 35b, 35c, 36a, and 36b for dividing the cover main part 32 into three or more and developing it by inflating and developing the air bag 22 are formed at the position opening the left open portion 33B that is a part of the cover main part 32 to the direction other than the upside of the steering wheel 10, and the decorative part 40 is formed on the left open portion 33B. Therefore, when the cover main part 32 is divided by inflating and developing the air bag 22, the decorative part 40 is opened together with the left open portion 33B to the direction other than the upside of the steering wheel 10. In addition, the upper open portion 33A that is a dividing part of the air bag cover 30 is not easily caught on the wheel part 12 at the upper part of the steering wheel 10. Accordingly, the escape path of the air bag 22 to escape into the inner periphery side of the wheel part 12 is secured. Thus, the impact on the occupant is absorbed particularly when the occupant is out of position.

Further, each of the developing lines 34a, 34b, 35a, 35b, 35c, 36a, and 36b intersects at the respective intersections obliquely, so that the force dividing the predetermined developing lines 34a, 34b, 35a, 35b, 35c, 36a, and 36b is transmitted diagonally to the other developing lines 34a, 34b, 35a, 35b, 35c, 36a, and 36b, allowing them easily to be divided. Accordingly, each of the developing lines 34a, 34b, 35a, 35b, 35c, 36a, and 36b is successively and smoothly divided, thereby smoothly tearing the air bag cover 30.

{Variant}

It should be noted that the developing lines 34a, 34b, 35a, 35b, 35c, 36a, and 36b in the above preferred embodiment are one of example, and the positions thereof is not restrictive.

Figure 8:
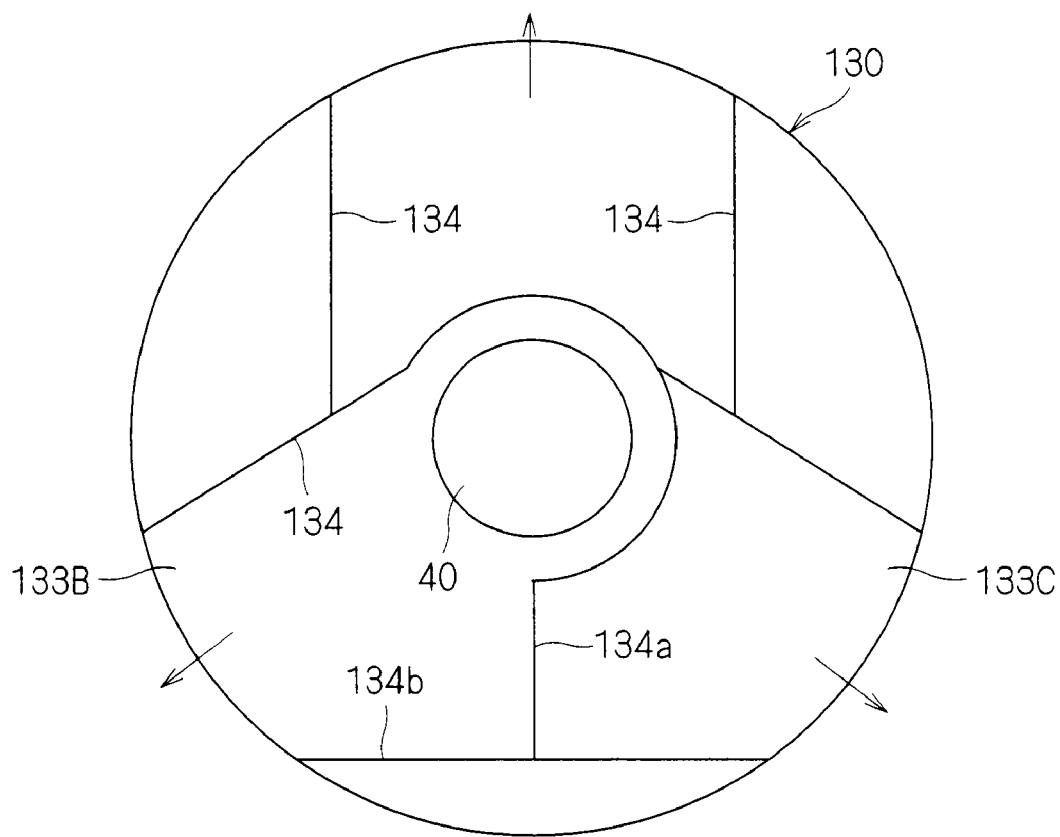
FIG. 8 is a view of showing a variant of the air bag cover.
Figure 9:
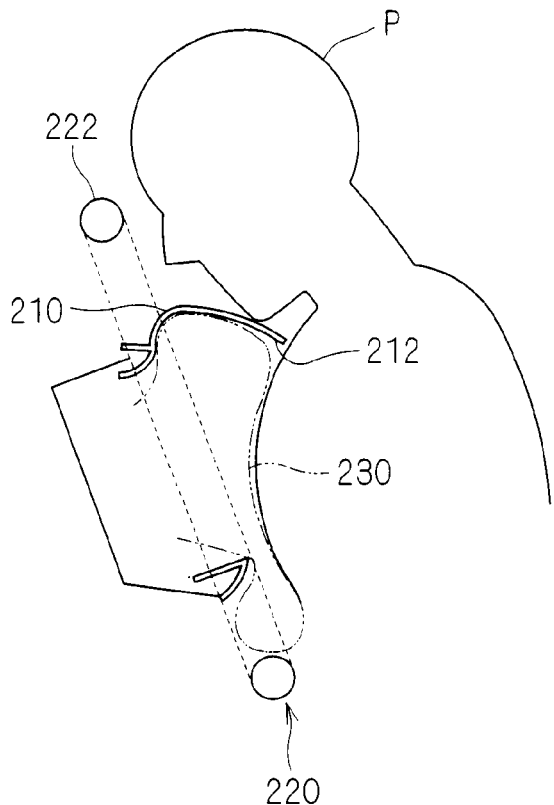
FIG. 9 is a view of showing a conventional example.
Figure 10:
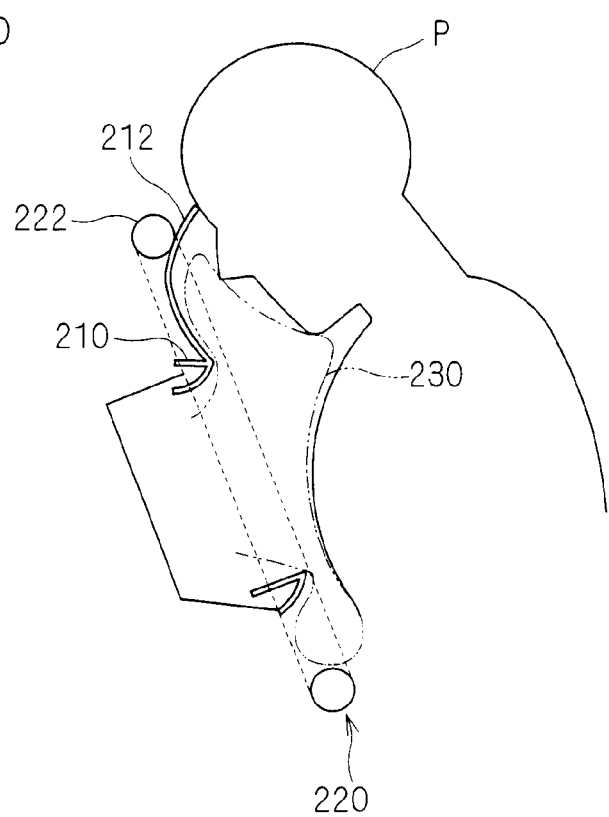
FIG. 10 is a view of showing a conventional example.

For instance, as an air bag cover 130 according to a variant shown in FIG. 8, a developing line 134a between a left open portion 133B and a right open portion 133C may extend along a substantially vertical direction, and a developing line 134b below the left open portion 133B and right open portion 133C may extend along a substantially horizontal direction. The other developing lines 134 and an upper open portion 133A are configured similarly as described in the above preferred embodiment.

Further, the air bag cover is not necessarily divided into four. For example, it may be configured to be divided into three of an upper open portion, left open portion, and right open portion, or into two of the upper open portion and a lower open portion.

Still further, a decorative part may be formed on any of the left open portion, right open portion, or lower open portion.

That is, the developing lines may be formed at the position opening at least one of the respective open portions of the cover main part 32 to the direction other than the upside of the steering wheel 10, and the decorative part may be formed on that open portion.

Here, when the open portion provided with the decorative part is open to the direction other than the upside of the steering wheel 10, the mode where the open portion is developed laterally and substantially diagonally upward other than directly above may be included.

Alternatively, the open portion provided with the decorative part preferably develops toward a side of a vehicle or downward thereof, or more preferably develops toward below the side of the vehicle.

While the air bag cover and the air bag device according to the invention has been shown and described in detail, the foregoing description is in all aspects illustrative and not restrictive. It is therefore understood that numerous modifications and variations can be devised without departing from the scope of the invention.

The invention claimed is:

1. An air bag cover assembled in a steering wheel comprising:
    a cover main part attached so as to cover an air bag in an inner periphery side of a wheel part of said steering wheel;
    a decorative part formed on a surface of said cover main part at a position of a substantially center of said steering wheel; wherein
    a developing line is formed in said cover main part so as to divide said cover main part into three or more portions and open said cover main part by inflating and developing said air bag, the developing line being formed at a position so as to open at least one of the three or more portions of the cover main part toward a direction other than an upside of said steering wheel, and the developing line is formed as a plurality of developing lines, a section of one of said plurality of developing lines contouring a periphery of said decorative part being obliquely intersected by only one of said plurality of developing lines between endpoints of the section, and
    said decorative part is formed on one of the three or more portions opening toward a direction other than the upside of said steering wheel.

2. The air bag cover according to claim 1, wherein said developing line is formed so as to open the one of the three or more portions of said cover main part where said decorative part is formed, toward a direction of a side of said steering wheel or a downside of said steering wheel.

3. The air bag cover according to claim 1, wherein said developing line for dividing said cover main part into the three or more portions and opening said cover main part by inflating and developing said air bag, is formed at a position dividing said cover main part into an upper open portion opening toward the upside of said steering wheel, a lower open portion opening toward a downside of said steering wheel, a left open portion opening toward a left direction of said steering wheel, and a right open portion opening toward a right direction of said steering wheel, and
    said decorative part is formed on any one of said lower open portion, said left open portion, and said right open portion.

4. The air bag cover according to claim 1, wherein each of said plurality of developing lines intersect with each other obliquely.

5. An air bag device assembled in a steering wheel, comprising:
    an air bag attached to a substantially center of said steering wheel;
    a gas supply part for inflating and developing said air bag; and
    an air bag cover according to claim 1.

6. The air bag cover according to claim 1, wherein
    the one of said plurality of developing lines with the section that contours the periphery of said decorative part is a first developing line to tear as said air bag is inflated and developed.

7. The air bag cover according to claim 1, wherein
    said plurality of developing lines form two three-forked road intersections each formed by a respective one of said plurality of developing that extends in a vertical direction obliquely intersecting with a respective one of said plurality of developing lines that extends away from said decorative part in a downward slanting direction.

8. The air bag cover according to claim 1, wherein
    only the one of the three or more portions in said cover main part where said decorative part is formed is caught on the wheel part when opened.

9. The air bag cover according to claim 1, wherein
    none of the three or more portions that open toward the upside of said steering wheel is caught on the wheel part when opened.

10. The air bag cover according to claim 1, wherein
    the periphery of said decorative part has a curved shape.

* * * * *